United States Patent [19]
Horvath et al.

[11] 3,945,260
[45] Mar. 23, 1976

[54] ACTUATOR ASSEMBLY

[75] Inventors: Louis T. Horvath, Solon; Clifford H. Allen, Chesterland, both of Ohio

[73] Assignee: Teleflex Incorporated, North Wales, Pa.

[22] Filed: Aug. 13, 1973

[21] Appl. No.: 387,937

[52] U.S. Cl. .................. : 74/89.17; 74/487; 74/422; 74/498
[51] Int. Cl. .......................................... F16h 19/04
[58] Field of Search ............... 74/29, 32, 33, 487

[56] References Cited
UNITED STATES PATENTS

| | | | |
|---|---|---|---|
| 1,598,091 | 8/1926 | LaRocca | 74/29 |
| 2,190,572 | 2/1940 | Schottenberg | 74/33 |
| 3,157,060 | 11/1964 | Marr | 74/487 |
| 3,460,346 | 8/1969 | Branson | 74/29 |

Primary Examiner—Wesley S. Ratliff, Jr.
Attorney, Agent, or Firm—McGlynn and Milton

[57] ABSTRACT

An improved actuator assembly of the type for use in a boat to convert rotary motion to rectilinear motion for moving a motion transmitting core element to rotate an outboard motor or the like for steering the boat. The improved actuator includes a rack and pinion assembly with a housing surrounding the rack and pinion. The housing supports the pinion for rotation about an axis and supports the rack for movement tangentially of the pinion. The housing extends from the axis farther in one direction than in the other direction. There is also included a shaft housing adapted to be mounted on a bulkhead in a boat and the housing may be disposed with either of its sides connected to the shaft housing whereby the housing may be disposed so that the short end extends in either direction from the axis of rotation of the pinion without dismantling the housing and rack and pinion assembly.

13 Claims, 10 Drawing Figures

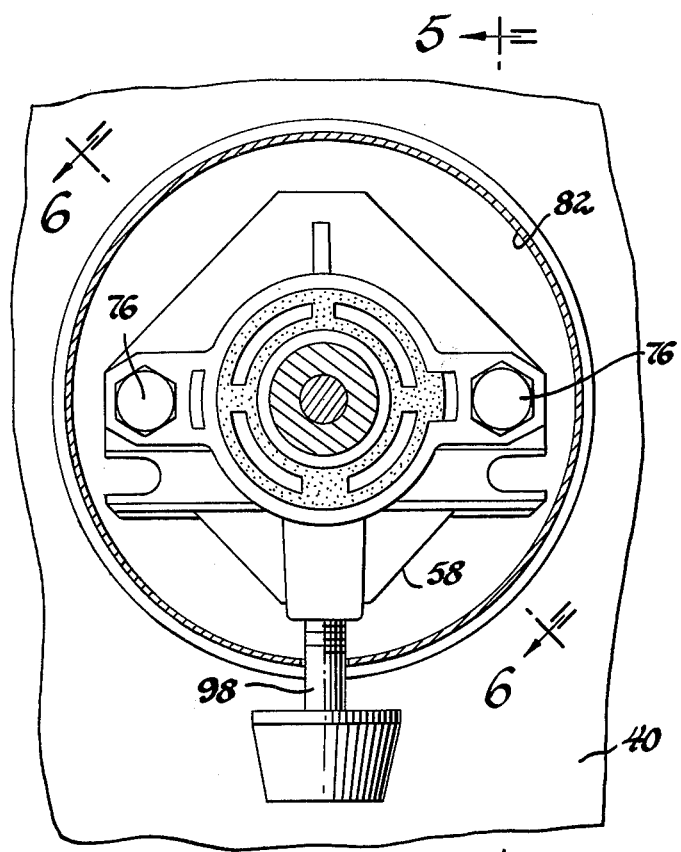
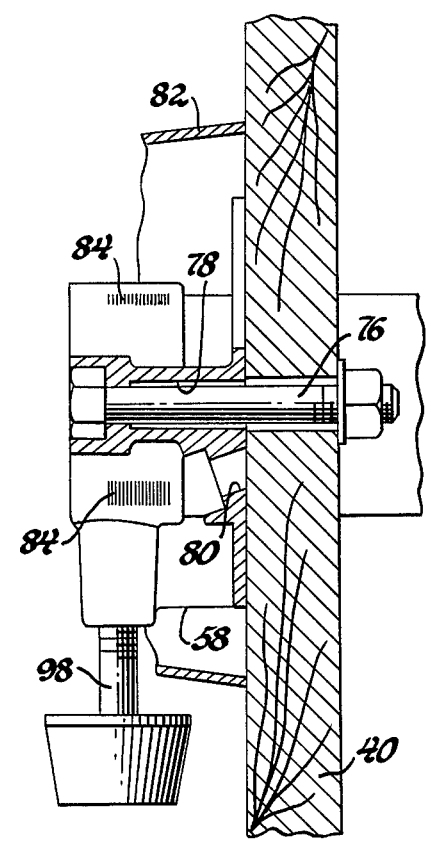
Fig. 4    Fig. 5
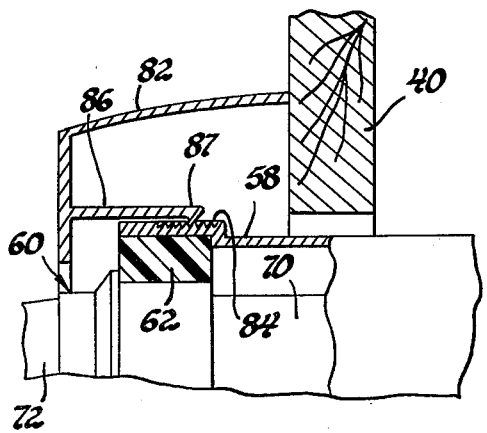
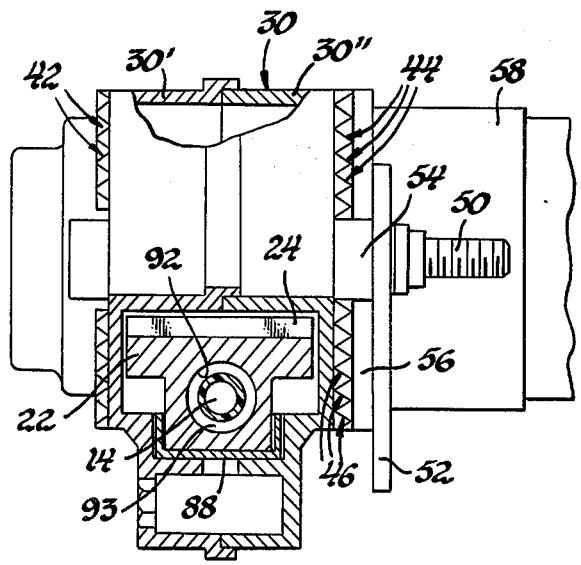
Fig. 6    Fig. 7

ACTUATOR ASSEMBLY

This invention relates to an actuator assembly of the type utilized in a steering system in a boat whereby the rotary motion imparted to the steering wheel is converted to rectilinear motion for rotating the propulsion unit of the boat for steering the boat.

Rack and pinion actuators are known to convert the rotary motion of a steering wheel in a boat to rectilinear movement for rotating the propulsion unit. The prior art units have, however, been symmetrical about a central axis so that the housing extends from the axis of rotation of the pinion an equal distance in either direction. The reason for this configuration is that the rack may be necessarily moved to the right as viewed by the operator of the boat to effect a right turn in one configuration whereas in another configuration, the rack may be necessarily moved to the left to effect a right turn. More specifically, the rack is normally moved upon rotation of the pinion and is connected to a flexible motion transmitting core element which is supported in a guide conduit and extends to an attachment to the propulsion unit of the boat. Such an arrangement is schematically illustrated in FIGS. 9 and 10 of the subject application. In FIG. 9 in solid lines, the actuator A operates a core element which is attached to a propulsion unit or motor M forward of the axis of rotation of the motor so that to effect a right turn of the boat as the steering wheel is rotated clockwise the core element must be pulled in the direction of the arrow. Thus, the rack must be disposed above the pinion in the configuration shown in solid lines in FIG. 9. In the configuration shown in phantom lines in FIG. 9, the rack must also be disposed above the pinion to effect a right turn as the core element must be pushed or placed in compression during the right turn. In FIG. 10, the core element is attached rearwardly of the axis of rotation of the motor M and, therefore, as illustrated in full lines, the core element must be pushed or placed in compression to effect a right turn. This necessarily requires the rack to be below the pinion to effect a right turn as the steering wheel W is rotated clockwise. Thus, it will be noted that when the actuator is in the position illustrated in full lines in FIG. 9 where the rack is above the pinion, the guide conduit for the core element enters into the actuator at the left end of the housing; yet when in the position illustrated in phantom in FIG. 9 where the rack is also above the pinion, the guide for the core element must enter the actuator housing from the right-hand end. Thus, for a given actuator to accommodate both of these situations, it must be capable of being disassembled and accommodating the guide conduit for the core into either end of the assembly.

It will also be appreciated that to obtain the necessary stroke in the movement of the rack in either direction, the housing must extend an equal distance in opposite directions from the axis of rotation of the pinion to allow the rack to move an equal distance in either direction from the axis of rotation to accommodate either push or pull movement of the core element for a turn in a given direction. Thus, since push or pull movement of the core element may be required for a right- or left-hand turn, depending upon the place of attachment of core element to the propulsion unit, the housing must necessarily extend an equal distance in both directions from the axis of rotation of the pinion to accommodate either of these requirements.

The dismantling of an actuator assembly by the user to insert the guide conduit for the core element into the desired end of the actuator assembly is, indeed, very unsatisfactory. It will be appreciated that such a dismantling of an actuator assembly subjects the assembly to malfunction and, indeed, presents warranty problems to the manufacturer of actuator assemblies. Also, there are numerous situations in a boat configuration where the space limitations are such that the stroke length necessary prohibits the use of such rack and pinion actuators because they are too long to fit in the space provided. In such situations, other types of actuators are utilized.

Accordingly, it is an object and feature of this invention to provide an improved actuator assembly including a rack, a pinion engaging the rack for moving the rack, a housing surrounding and rack and pinion for supporting the pinion for rotation about an axis and supporting the rack for movement tangentially of the pinion with the housing extending from the axis of the pinion in one direction farther than the other, with the longest length from the axis being determined by the required stroke so that the assembly may fit in smaller spaces than heretofore known rack and pinion actuator assemblies.

In correlation with the foregoing object and feature, it is another object and feature of this invention to include in the assembly a mounting means for attachment to a support structure with the housing being connectable to the mounting means at either side of the housing so that the housing may be disposed with the short extension in the proper position regardless of the steering requirement.

Other objects and attendant advantages of the present invention will be readily appreciated as the same becomes better understood by reference to the following detailed description when considered in connection with the accompanying drawings wherein:

FIG. 4 is a cross-sectional view taken substantially along line 4—4 of FIG. 2;

FIG. 5 is a cross-sectional view taken substantially along line 5—5 of FIG. 4;

FIG. 6 is a fragmentary cross-sectional view taken substantially along line 6—6 of FIG. 4;

FIG. 7 is a cross-sectional view taken substantially along line 7—7 of FIG. 3.

Figure 1:
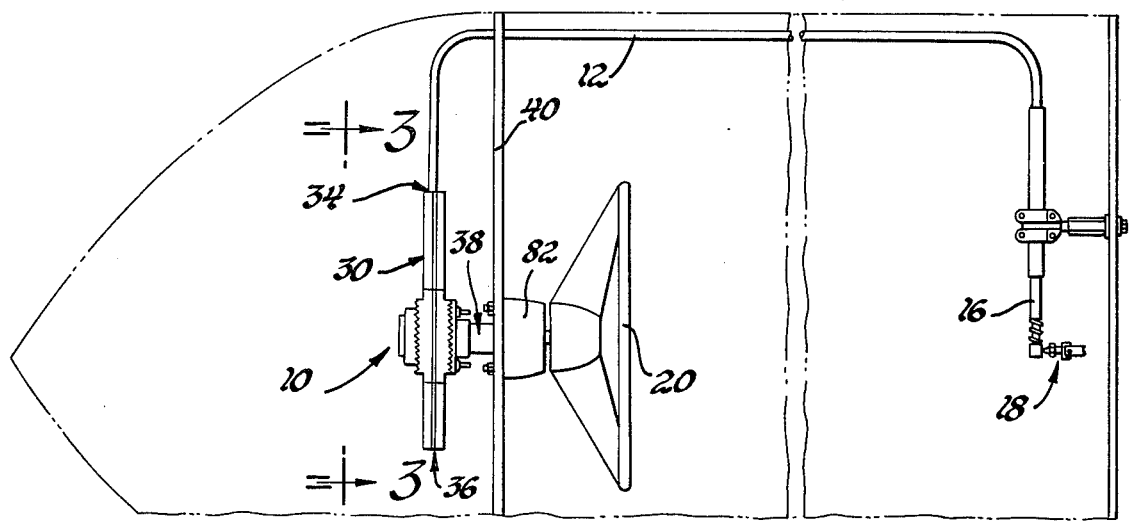
FIG. 1 is a plan view showing the actuator assembly of the instant invention disposed in a boat.

Referring now to the drawings wherein like numerals indicate like parts throughout the several views, an improved actuator assembly constructed in accordance with the instant invention is generally shown at 10. The actuator assembly 10 is connected to a conduit 12 which movably supports therewithin a flexible motion transmitting core element 14. The core element 14 is connected to a slidable rod 16, which in turn has a connection, generally indicated at 18, adapted for connection to the propulsion unit of the boat. The propulsion unit being an outboard motor or an inboard-outboard motor. A steering wheel 20 is attached to the actuator assembly 10 and the actuator assembly 10 converts the rotary motion imparted to the steering wheel 20 to rectilinear motion for moving a core element 14 for rotating the propulsion unit, the propulsion unit being connected to the connector 18. As alluded to hereinbefore, the connector 18 may be attached to one side of the axis of rotation of the propulsion unit whereby the core element 14 will be pushed or pulled in one direction whereas, if the connector 18 is attached on the opposite side of the axis of rotation of the propulsion unit, the core element will be necessarily pushed or pulled in the opposite direction.

The actuator assembly 10 includes a rack 22 which includes a plurality of teeth 24. A pinion 26 includes a plurality of teeth 28 and engages the rack 22 for moving the rack rectilinearly. A rack and pinion housing generally indicated at 30 supports and surrounds the rack 22 and pinion 26 and supports the pinion 26 for rotation about an axis 32. The housing 30 also supports the rack 22 for movement tangentially of the pinion 26. As best illustrated in FIG. 7, the housing 30 comprises two halves 30' and 30".

Figure 3:
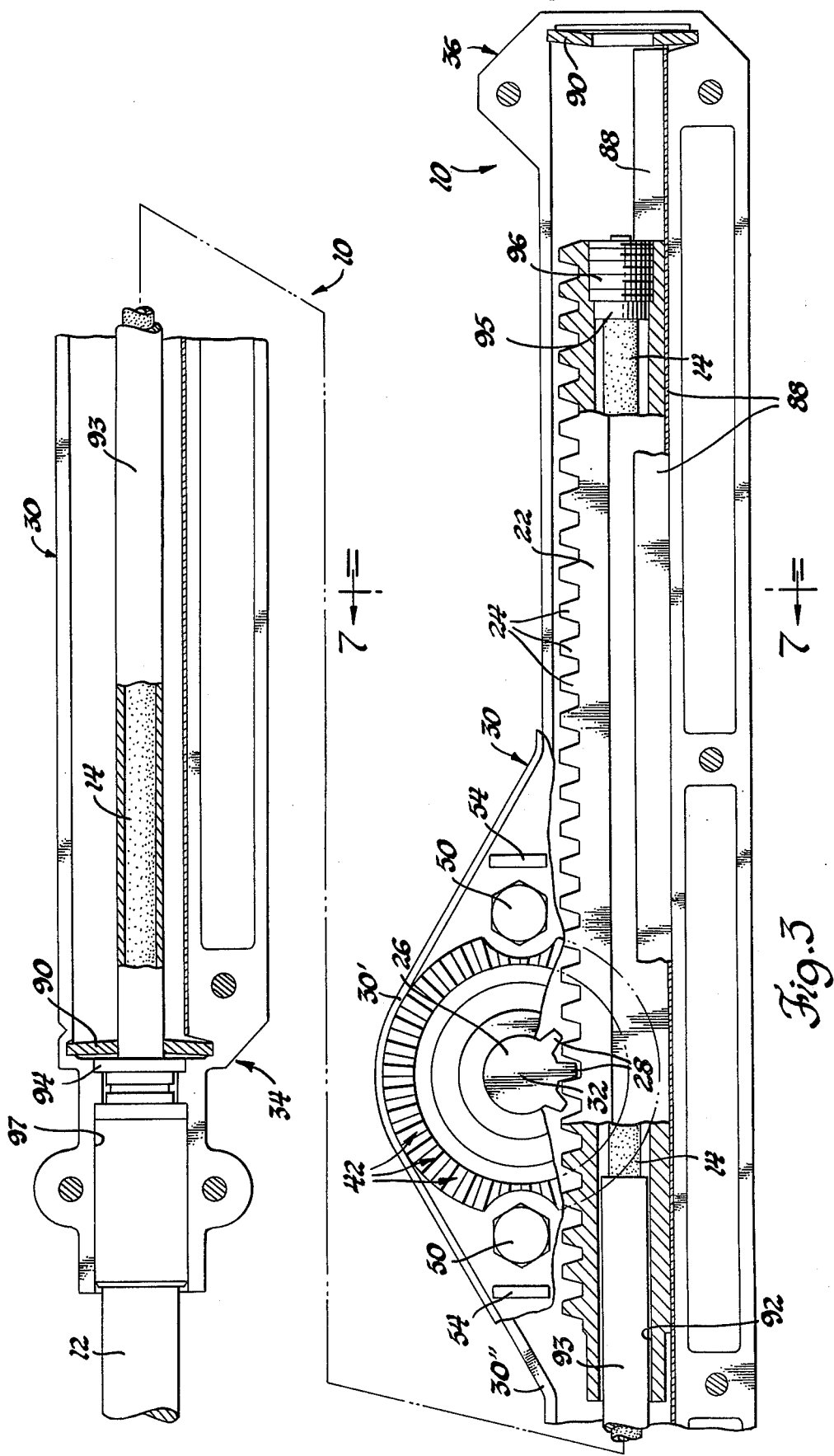
FIG. 3 is an enlarged view taken along line 3—3 of FIG. 1 with the actuator assembly partially broken away and in cross section.

As best illustrated in FIGS. 1 and 3, the housing 30 extends from the axis 32 of the pinion 26 in one direction farther than in the other direction. In other words, the housing 30 has a first end generally indicated at 34 which is disposed farther away from the axis 32 than the other end generally indicated at 36.

Figure 2:
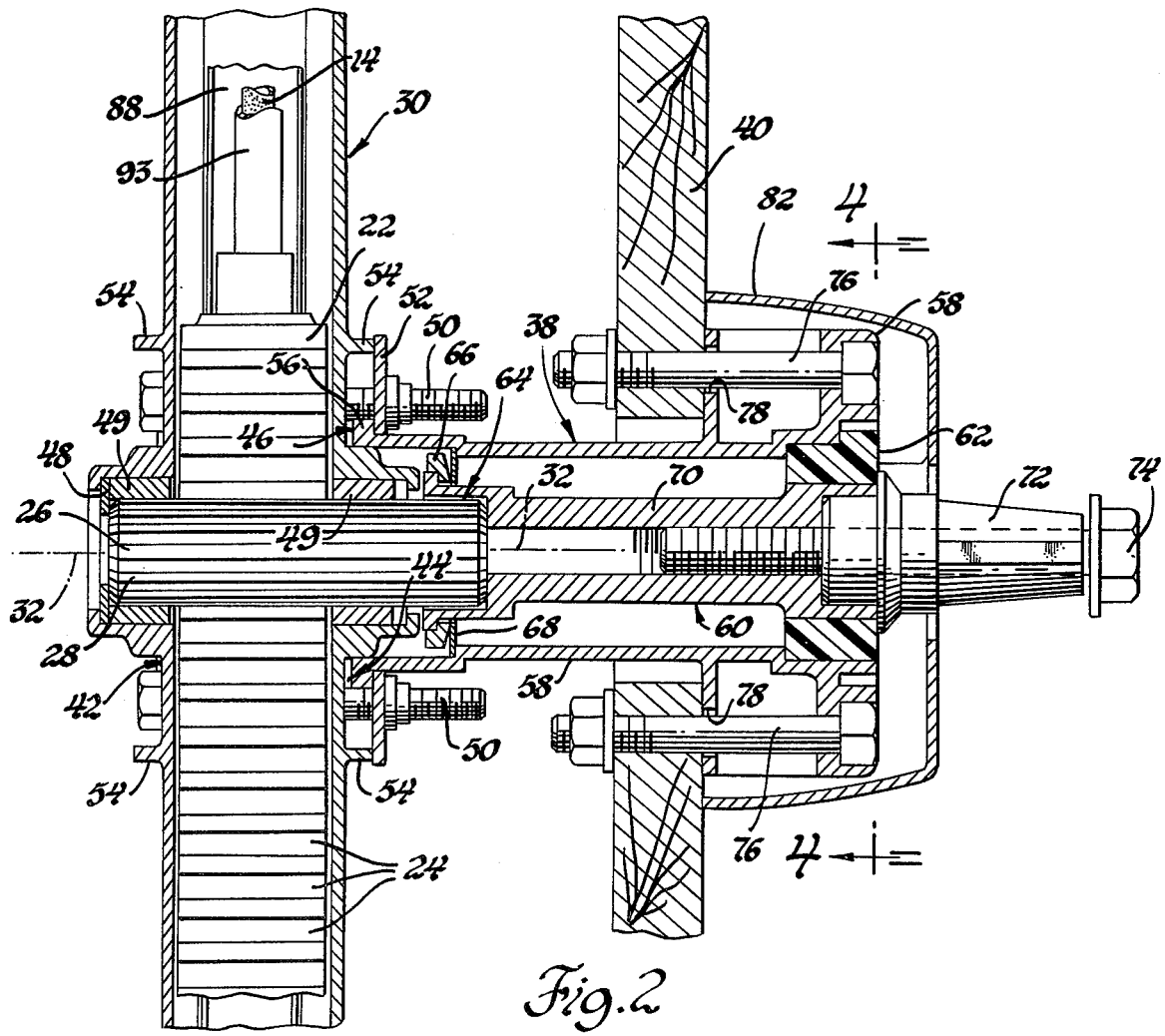
FIG. 2 is an enlarged fragmentary cross-sectional view of the actuator assembly of the instant invention as it is attached to a support structure.

The assembly 10 also includes a mounting means, generally indicated at 38 in FIGS. 1 and 2, for attachment to a support structure such as the bulkhead 40. The housing 30 is connectable to the mounting means 38 at either side of the housing. More specifically, there is included connection means for connecting the housing 30 to the mounting means 38 while maintaining the housing 30 in a fixed position relative to the mounting means 38. The connection means includes the irregularities comprising serrations generally indicated at 42 and 44 disposed on a circle (as best viewed in FIG. 3) about the axis 32 on the exterior of the sides of the housing 30. The mounting means 38 includes coacting irregularities comprising serrations generally indicated at 46 for coacting with the serrations 42 or 44 on the housing 30. That is, the housing 30 may be disposed with the serrations 44 in engagement with the serrations 46, as illustrated, or may be rotated 180 degrees about its longitudinal axis whereby the serrations 42 will be disposed in engagement with the serrations 46 on the mounting means 38. If the serrations 42 on the housing 30 are placed in engagement with the serrations 46 on the mounting means 38, the rack 22 would move in the opposite direction for the same turning direction of the steering wheel 20. Thus, the rack 22 may be moved in either direction for a given direction of rotation of the steering wheel 20 by rotating the housing 180 degrees about its longitudinal axis so that the short end of the housing 30 is always disposed so as to extend in the same direction relative to the steering wheel 20.

In rotating the housing 30 180° about its longitudinal axis, the snap ring 48 would be moved from one side of the housing 30 to the other as the pinion 26 would be shifted longitudinally of its axis to protrude from the side of the housing engaging the mounting means 38.

A pair of bearing members 49 rotatably support the pinion 26 in the rack and pinion housing 30. The bearings 49 are preferably nonrotatable relative to the pinion 26 and rotate relative to the housing 30.

The connection means further includes a pair of bolts 50 which extend through the housing 30 and a clamping plate 52 interconnecting the housing 30 and the mounting means 38. More specifically, the housing 30 includes the projections 54 on each side thereof and the mounting means 38 includes a shoulder 56 against which the clamping plate 52 bears. The projections 54 on the housing 30 apply the clamping force evenly over the coacting serrations on the housing 30 and the mounting means 38.

It will be understood, of course, that the housing 30 may be rotated relative to the mounting means 38 and secured in position by the tightening of the bolts 50 so that the longitudinal axis of the housing 30 may be disposed at any one of various positions relative to the mounting means 38.

Figure 9:
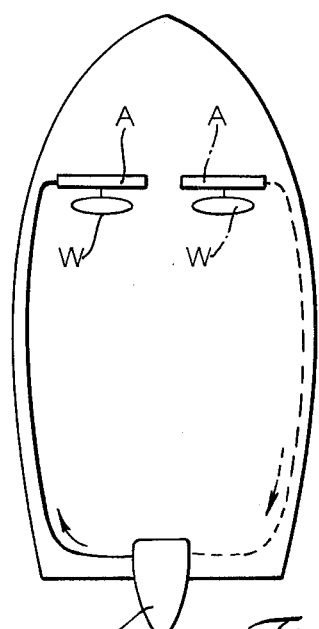
FIG. 9 is a schematic view showing the actuator assembly in left and right positions when the control cable is attached forwardly of the rotational axis of the outboard engine.
Figure 10:
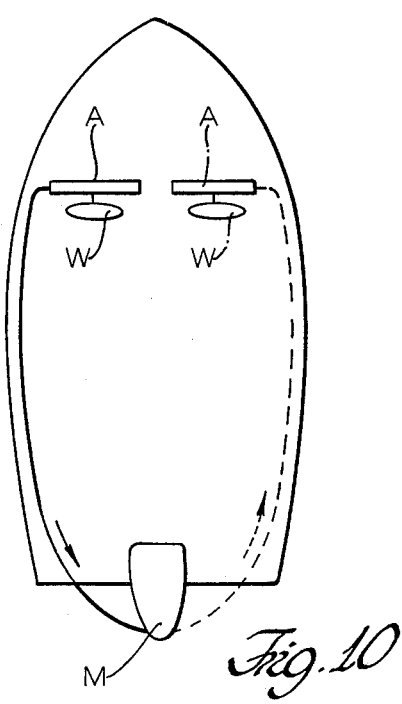
FIG. 10 is a schematic view showing the actuator assembly in left and right positions when the control cable is attached rearwardly of the rotational axis at the outboard engine.

Referring again to FIGS. 9 and 10, it will be appreciated that the actuator assembly of the instant invention may accommodate the various positions shown in FIGS. 9 and 10 without being dismantled. In other words, the actuator assembly of the instant invention will accommodate the various positions illustrated in FIG. 9 while the conduit 12 remains secured to the same end 34 of the housing 30. When the actuator assembly of the instant invention is disposed in the position shown in full lines in FIG. 9, the rack 22 would be disposed above the pinion 26 and, therefore, the serrations 44 would be in engagement with the serrations 46 on the shaft housing 38; i.e., the housing 30 would be rotated 180 degrees about the shaft axis 32 from the position shown in FIG. 2. In order to accommodate the position show in phantom lines in FIG. 9, the rack would be above the pinion; however, the serrations 42 would be in engagement with the serrations 46 so that the opposite side of the housing 30 engages the shaft housing 38 in the respective positions shown in FIG. 9, the difference being that in the position shown in full lines. In other words, the housing would be rotated end for end between the two positions shown in FIG. 9. In a similar manner, the actuator assembly accommodates both of the positions illustrated in FIG. 10. Also, the elongated housing 30 need not be horizontal but may be disposed in a variety of angular positions as accommodated by the spacing of the serrations 46.

The mounting means 38 includes a shaft housing 58 and a shaft generally indicated at 60 rotatably supported by the shaft housing 58. More specifically, a split bushing bearing 62 is supported by the shaft housing 58 and surrounds the shaft 60. The shaft 60 is connected to the pinion 26 through a keyed or splined connection generally indicated at 64. The shaft 60 is retained on the pinion 26 by a ring 66 disposed about a shoulder on the shaft 60 and a retaining member 68.

The shaft generally indicated at 60 includes a coupler member 70 which is secured to the pinion 26 by the splined connection 64, and a wheel bushing 72. The wheel bushing 72 is adapted to receive the steering wheel 20 and is keyed to prevent rotation of the steering wheel 20 relative thereto. Additionally, the bushing 72 is nonrotatably keyed, as by being splined but not limited to such a nonrotative connection, to the coupler 70. However, the keyed interconnection between the bushing 72 and the coupler 70 allows the bushing 72 to be removed from the keyed relationship with the coupler 70 and rotated relative to the coupler 70 and replaced in the keyed relationship with the coupler 70. There is included a fastener comprising a bolt 74 threadedly engaging the coupler 70 for retaining the bushing 72 to the coupler 70. The purpose of the keyed connection between the bushing 72 and the coupler 70 is to facilitate the alignment of the steering wheel 20 when the actuator 10 is in the neutral position. In other words, if the actuator 10 is in the neutral position so that the propulsion unit is in the straight-ahead position and the steering wheel 20 is not aligned or in a position indicating straight-ahead steering, the bolt 74 may be unthreaded from the coupler 70 to remove the bushing 72 and rotate it relative to the coupler 70 and to replace it in a keyed relationship therewith so that the steering wheel 20 is in the proper position.

Figure 8:
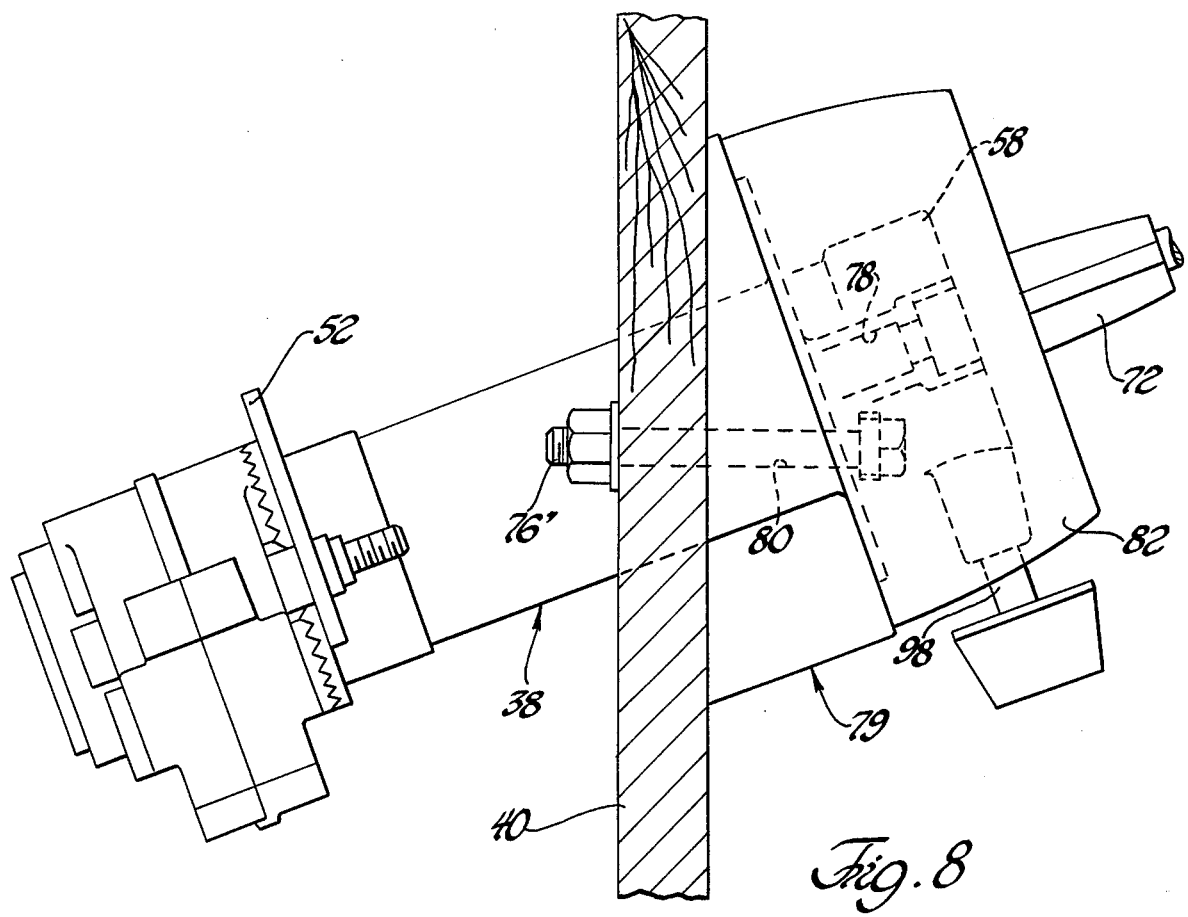
FIG. 8 is a view showing the actuator assembly mounted on a bulkhead at an angle other than perependicular.

Bolts 76 extend through a pair of mounting holes 78 for attaching the shaft housing 58 to a planar support structure such as the bulkhead 40. As illustrated, the housing 58 is perpendicular to the bulkhead 40. However, the shaft housing 58 includes a second pair of mounting holes 80 as shown in FIGS. 5 and 8 which are at different angles than the mounting holes 78. As shown in FIG. 8, a wedge member 79 may be disposed under the head of the shaft housing 58 and the bolts 76' extended through the mounting holes 80 to mount the assembly at an angle (such as 20°) relative to the bulkhead 40. The first pair of holes 78 are spaced the same distance apart as the second pair of holes 80. More specifically, the axes of the first pair of holes 78 intersect the axes of the second pair of holes 80, the axes preferably being at an angle of 20° relative to one another so that the shaft 60 may be disposed at an angle of 20° relative to the bulkhead 40. The prior art actuator assemblies typically include one pair of holes and, therefore, mounting holes must be drilled perpendicularly to the bulkhead in one situation and at an angle of 20° to the bulkhead in the other situation; thus, requiring two different patterns for forming the holes in the bulkhead.

The assembly also includes a bezel 82 adapted for disposition over the shaft housing 58 and against the bulkhead or support structure 40 to which the shaft housing 58 is attached. The shaft housing 58, as best shown in FIGS. 5 and 6, has a plurality of serrations 84 disposed on the exterior thereof. More specifically, the serrations 84 are in a plurality of circumferentially spaced groups, preferably three such groups disposed 120° apart. The bezel 82 includes three fingers 86, one of which is shown in FIG. 6, with hook portions 87 at the ends thereof for engaging the serrations 84 on the shaft housing 58 for retaining the bezel 82 on the shaft housing 58 and wedged or pressed against the bulkhead 40. In removing the bezel 82 from the shaft housing 58, the bezel 82 is rotated to disengage the hook portions 87 from the serrations 84.

The assembly also includes various additional perfecting features.

There is included a biasing means comprising an elongated stainless steel spring member 88 for urging the rack 22 into engagement with the pinion 26. The metal spring member 88 slants upwardly from the ends thereof so as to be crowned in the middle.

Additionally, there is included cushioning means comprising the bellville washers 90 as illustrated in FIG. 3 at each end of the housing 30 for engaging the rack 22 at the extremes of rack traveled.

The rack 22 has a bore 92 extending therethrough from one end to the other. A guide tube 93 is secured 94 to the first end 34 of the housing 30 and extends into the bore 92 in the rack at all positions of travel of the rack. In other words, when the rack 22 is moved to the extreme right-hand position as viewed in FIG. 3, the guide tube 93 will extend into the bore 92 approximately one-half inch. The flexible motion transmitting core element 14 extends through the guide tube 93 and through the bore 92 and is secured at 95 to the rack 22 at the end thereof which is opposite to the end into which the guide tube 93 extends. The core element 14 is secured to a plug 96 which is in turn secured to the rack 22.

A conduit receiving means comprising a clamped pocket 97 is disposed at the first end 34 of the housing 30 for receiving and retaining the conduit 12 to the housing 30. As mentioned hereinbefore, the conduit 12 movably supports the flexible motion transmitting core element 14.

As mentioned hereinbefore, the bushing 62 is split, meaning that it has axially extending slits or slots whereby its circumference can be reduced. An adjustment means comprising the threaded rod 98 is threadedly supported by the shaft housing 58 and is engagable with the bushing 62 for adjusting the frictional resistance applied by the bushing 62 to the rotation of the coupler 70. In other words, the rod 98 may force the bushing 62 into frictional engagement with the coupler 60 to provide the desired steering wheel feel and to compensate for motor torque feedback.

The invention has been described in an illustrative manner; and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

The embodiments of the invention in which an exclusive property or privelege is claimed are defined as follows:

1. An improved actuator assembly comprising; a rack, a pinion engaging said rack for moving said rack, a rack and pinion housing supporting said pinion for rotation about an axis and supporting said rack for movement tangentially of said pinion, said housing (surrounding and) extending along said rack from said axis farther in one direction than in the opposite direction for supporting said rack farther in said one direction than said opposite direction.

2. An assembly as set forth in claim 1 including biasing means for urging said rack into engagement with said pinion.

3. An assembly as set forth in claim 1 including cushioning means at each end of said housing for engaging said rack at the extremes of rack travel.

4. An assembly as set forth in claim 1 wherein said rach has a bore extending therethrough and including a guide tube secured to a first end of said housing and extending into said bore in said rack at all positions of travel of said rack.

5. An assembly as set forth in claim 4 including a motion transmitting core element extending through said guide tube and through said bore in said rack, said core element being secured to said rack at the end thereof opposite to the end into which said guide tube extends.

6. An improved actuator assembly comprising; a rack, a pinion engaging said rack, a rack and pinion housing surrounding said rack and pinion, and biasing means reacting between said housing and said rack for urging said rack into engagement with said pinion, said biasing means comprising an elongated metal spring member disposed in parallel relationship to said rack and crowned between the ends thereof.

7. An improved actuator assembly comprising; a rack, a pinion engaging said rack, a housing surrounding said rack and pinion, and cushioning means at each end of said housing for engaging said rack only at the extremes of rack travel.

8. An assembly as set forth in claim 7 wherein said cushioning means comprises a bellville washer at each end of said housing.

9. An improved actuator assembly comprising; a rack, a pinion engaging said rack, a housing surrounding said rack and pinion, said rack having a bore extending therethrough, a guide tube secured to a first end of said housing and extending into said bore in said rack at all positions of travel of said rack.

10. An assembly as set forth in claim 9 including a motion transmitting core element extending through said guide tube and through said bore in said rack, said core element being secured to said rack at the end thereof opposite to the end into which said guide tube extends.

11. An improved actuator assembly comprising; actuator means including a rack and pinion for converting rotary motion to rectilinear motion, a separate coupler for transmitting rotary motion to said pinion, a wheel bushing for receiving a steering wheel, said bushing being nonrotatably keyed to said coupler and removable from said keyed relationship with said coupler to be rotated relative to said coupler any one of various angular amounts and replaced in said keyed relationship with said coupler in any one of various angular positions relative to said coupler.

12. An assembly as set forth in claim 11 including a fastener for securing said bushing to said coupler.

13. An assembly as set forth in claim 12 wherein said fastener is a bolt threadedly engaging said coupler.

* * * * *